United States Patent Office 3,117,956
Patented Jan. 14, 1964

3,117,956
AZO DYES
Guenter Lange, Ludwigshafen (Rhine)-Gartenstadt, and Hans Guenter Wippel, Ludwigshafen (Rhine), Germany, assignors to Badische Anilin- & Soda-Fabrik Aktiengesellschaft, Ludwigshafen (Rhine), Germany
No Drawing. Filed Feb. 15, 1961, Ser. No. 89,359
Claims priority, application Germany Feb. 18, 1960
5 Claims. (Cl. 260—152)

This invention relates to new water-insoluble azo dyes which contain in the molecule a radical of the general formula:

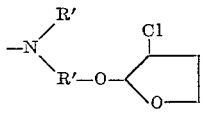

I to a process for their production and to their use for dyeing textile materials and shaped articles of synthetic materials. In the said Formula I, R stands for an alkyl radical which may be substituted by non-ionic radicals and R' for an alkylene group which may bear further non-ionic radicals. R and R' may be connected to each other either directly or by way of hetero atoms, and one of the radicals R and R' may be connected to a benzene ring at the ortho position to the amino group.

The term "textile materials" includes fibers, flock, threads and woven and non-woven fabrics. The term "shaped articles" includes films and sheets. The term "synthetic materials" includes linear polyamides, such as nylon 6, nylon 66 or nylon 11, and linear polyurethanes. The dyes of this invention are especially suitable for dyeing or printing cellulose 2½-acetate, cellulose triacetate and polyethylene terephthalate.

It is an object of this invention to provide dyes which will dye especially textile materials of the three last-mentioned substances bright shades of excellent fastness to rubbing and light.

Another object of this invention is to provide dyes which dye textile materials of cellulose 2½-acetate with outstanding waste gas fastness.

The new dyes of this invention are obtained by coupling aromatic or heterocyclic diazo compounds which may contain non-ionic radicals with compounds of the benzene series which contain attached to a benzene ring a substituted amino group of the above general Formula I which couples at the para position to this amino group and may bear further non-ionic radicals in the benzene ring, or by reacting azo dyes of the general formula:

$$A—N=N—B \qquad II$$

in which A denotes the radical of a diazotizable aromatic amine or heterocyclic amine and B denotes a radical of the benzene series which bears at the para-position to the azo group a substituted amino group of the general formula:

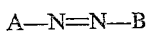

III in which R and R' have the meanings given above with 2,3-dichlortetrahydrofurane.

Diazotizable amines suitable for the production of the new dyes include aminobenzene and its derivatives containing non-ionic radicals, such as halogen atoms, nitro, cyano, alkyl, acylamino, alkylsulfonyl, trifluoromethyl, alkoxy and/or carbalkoxy groups; also 2-aminothiazole and 2-amino-1,3,4-thiadiazole as well as their derivatives substituted by the said non-ionic groups or by alkyl or aryl radicals.

Suitable coupling components which contain the radical of the above general Formula I include the 3-chlorotetrahydrofuryl-(2)-hydroxy derivatives of N,N-dialkylaminobenzenes, such as N-ethyl-N-(3-chlorotetrahydrofuryl-(2)-hydroxyethyl)-aminobenzene,
N-cyanoethyl-N-(3-chlorotetrahydrofuryl-(2)-hydroxyethyl)-amino benzene,
N-chloroethyl-N-(3-chlorotetrahydrofuryl-(2)-hydroxyethyl)-aminobenzene,
N-[2-(3-chlorotetrahydrofuryl-(2)-hydroxy)-3-chloropropyl]-N-ethylaminobenzene,
N,N-bis-(3-chlorotetrahydrofuryl-(2)-hydroxyethyl)-aminobenzene,
N-[2-(3-chlorotetrahydrofuryl-(2)-hydroxy)-3-cyanopropyl]-N-ethylaminobenzene,
N-(3-chlorotetrahydrofuryl-(2)-hydroxyethyl)-N-(2-acetoxyethyl)-aminobenzene,
N-(3-chlorotetrahydrofuryl-(2)-hydroxyethyl)-N-2-methoxyethyl)-aminobenzene,
N-(3-chlorotetrahydrofuryl-(2)-hydroxyethyl)-N-propylaminobenzene,
N-(3-chlorotetrahydrofuryl-(2)-hydroxyethyl)-N-(2,2-difluoroethyl)-aminobenzene and the m-alkyl, m-alkoxy, m-trifluoromethyl, m-acylamino, m-cyano and m-halogen derivatives of these compounds.

Other useful coupling components include

N-alkyl-3-chlorotetrahydrofuryl-(2)-hydroxy-tetrahydroquinolines, such as
N-butyl-3-[3-chlorotetrahydrofuryl-(2)-hydroxy]-7-methyl-1,2,3,4-tetrahydroquinoline, and
N-alkyl-[3-chlorotetrahydrofuryl-(2)-hydroxy]-phenomorpholines, such as
N-ethyl-3-[3-chlorotetrahydrofuryl-(2)-hydroxy]-phenomorpholine.

These coupling components are obtained by reaction of appropriate compounds of the benzene series, capable of coupling which bear the group of the Formula III above, with 2,3-dichlorotetrahydrofurane.

The reaction of the said compounds capable of coupling with 2,3-dichlorotetrahydrofurane may be effected by slowly introducing an about equimolar amount of 2,3-dichlorotetrahydrofurane into the coupling component at temperatures between 0° and 100° C., preferably at room temperature. An inert solvent, for example dioxane, may be coemployed. In some cases, it is advisable to heat the reaction mixture for a short time (about 10 minutes) at 50° to 120° C., especially 100° C., to complete the reaction. The reaction is complete when a sample taken from the reaction mixture is uniform in a paper chromatogram after having been sprayed with an aqueous solution of nitrosamine. The coupling components obtained may be used for the production of the new azo dyes without purification.

The production of 2,3-dichlorotetrahydrofurane is described for example in "Liebigs Annalen der Chemie," vol. 596 (1955), p. 113.

Dyes of the general Formula II above are known; they can be synthesized from the above-mentioned diazo compounds and the above-mentioned compounds capable of coupling and containing the group of the general Formula III above. The reaction of these dyes with 2,3-dichlorotetrahydrofurane is carried out in the same way as above described for the production of the coupling components.

Of the new dyes of this invention, those are especially preferred in which R in the above formulae stands for a radical of the formula:

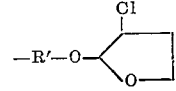

IV in which R' has the meaning given above, and those which have the general formula:

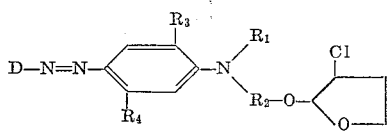

in which D denotes one of the radicals:

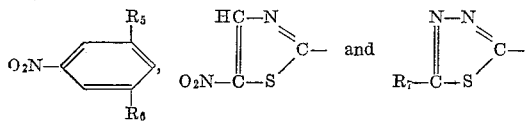

$R_1$ a low molecular weight alkyl, hydroxyalkyl or cyanoalkyl radical or the radical:

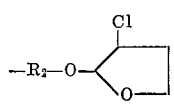

$R_2$ a low molecular weight alkylene, halogenalkylene or cyanalkylene radical, $R_3$ a hydrogen atom or a low molecular weight alkoxy radical, $R_4$ a hydrogen or halogen atom or a low molecular weight alkyl, trifluoromethyl or acylamino radical, $R_5$ a hydrogen or halogen atom, a cyano, trifluoromethyl, low molecular weight alkoxy or alkyl sulfonyl radical, $R_6$ a hydrogen atom or a nitro radical, and $R_7$ a low molecular weight alkyl radical or a phenyl radical.

The following examples illustrate the production and use of the new dyes but do not limit the invention. The parts and percentages specified in the examples are by weight.

*Example 1*

A mixture of 13.8 parts of 1-amino-4-nitrobenzene, 40 parts of concentrated hydrochloric acid and 40 parts of water is stirred for two hours at room temperature, 200 parts of ice are added and a solution of 6.1 parts of sodium nitrite in 20 parts of water is introduced at 0° to 5° C. The whole is stirred for 20 minutes, any excess of nitrite present removed by adding aminosulfonic acid and the diazo solution filtered. The filtrate is gradually added to a solution of 30.9 parts of the reaction product derived from N-(2-cyanoethyl) - N - (2-hydroxyethyl)-aminobenzene and 2,3-dichlorotetrahydrofurane in a mixture of 50 parts of water and 10 parts of concentrated hydrochloric acid. After 30 minutes, 35 parts of anhydrous sodium acetate are added to this mixture, the whole is stirred for an hour and the reaction product filtered off. It is washed with water and dried at about 40° C. under reduced pressure. A dye is obtained which dyes polyethylene glycol terephthalate bright red shades of good rubbing and light fastness.

Dyes with similar properties are obtained in the same way by using the compounds listed in the following table as coupling components instead of the reaction product from N-(2-cyanoethyl)-N-(2-hydroxyethyl) - aminobenzene and 2,3-dichlorotetrahydrofurane.

| Example No. | Coupling component | Dyeing on polyethylene glycol terephthalate |
|---|---|---|
| 2 | ⟨phenyl⟩-N($C_2H_5$)($C_2H_4O$-tetrahydrofuran-Cl) | Red. |
| 3 | ⟨phenyl⟩-N($C_2H_5$)($CH_2$-CH(O-tetrahydrofuran-Cl)-$CH_2Cl$) | Red. |
| 4 | ⟨phenyl⟩-N($C_2H_5$)($CH_2$-CH(O-tetrahydrofuran-Cl)-$CH_2CN$) | Red. |

Similar dyes of bluish shade are obtained by using 16.8 parts of 1-amino-2-methoxy-4-nitrobenzene or 17.3 parts of 1-amino-2-chlor-4-nitrobenzene instead of 1-amino-4-nitrobenzene:

| Example No. | Diazo component | Coupling component | Shade of dyeing on cellulose acetate |
|---|---|---|---|
| 5 | $O_2N$-⟨phenyl-OCH$_3$⟩-$NH_2$ | ⟨phenyl⟩-N($C_2H_5$)($C_2H_4O$-tetrahydrofuran-Cl) | Red. |
| 6 | $O_2N$-⟨phenyl-OCH$_3$⟩-$NH_2$ | ⟨phenyl⟩-N($C_2H_4CN$)($C_2H_4O$-tetrahydrofuran-Cl) | Red. |
| 7 | $O_2N$-⟨phenyl-OCH$_3$⟩-$NH_2$ | ⟨phenyl⟩-N($C_2H_5$)($CH_2$-CH(O-tetrahydrofuran-Cl)-$CH_2CN$) | Red. |

| Example No. | Diazo component | Coupling component | Shade of dyeing on cellulose acetate |
|---|---|---|---|
| 8 | 4-nitro-2-methoxyaniline (O$_2$N–C$_6$H$_3$(OCH$_3$)–NH$_2$) | 3-methyl-N-ethyl-N-[2-(3-chlorotetrahydrofuran-2-yloxy)ethyl]aniline | Red. |
| 9 | 4-nitro-2-chloroaniline (O$_2$N–C$_6$H$_3$(Cl)–NH$_2$) | N-ethyl-N-[2-(3-chlorotetrahydrofuran-2-yloxy)ethyl]aniline | Scarlet. |
| 10 | 4-nitro-2-chloroaniline | N-(2-cyanoethyl)-N-[2-(3-chlorotetrahydrofuran-2-yloxy)ethyl]aniline | Red. |
| 11 | 4-nitro-2-chloroaniline | N-ethyl-N-[3-cyano-2-(3-chlorotetrahydrofuran-2-yloxy)propyl]aniline | Red. |
| 12 | 4-nitro-2-chloroaniline | 3-methyl-N-ethyl-N-[2-(3-chlorotetrahydrofuran-2-yloxy)ethyl]aniline | Red. |

Example 13

A mixture of 5.15 parts of 1-amino-4-nitro-6-trifluoromethylbenzene, 25 parts of water and 25 parts of concentrated hydrochloric acid is stirred for two hours at room temperature, 20 parts of ice are added and a solution of 1.5 parts of sodium nitrite in 5 parts of water is added. Any excess of nitrite present is destroyed after two hours by adding aminosulfonic acid and the solution filtered. The filtrate is gradually introduced at 0° to 5° C. into a solution of 7.4 parts of the reaction product of N-ethyl-N-(2-hydroxyethyl)-aminobenzene with 2,3-dichlorotetrahydrofurane in 6 parts of water. 1.3 parts of sodium acetate are added to the mixture, the whole is stirred for 12 hours and the deposited reaction product is filtered off. The resultant dye is washed with water and dried at 50° C. under reduced pressure. It dyes polyethylene glycol terephthalate powerful red shades of good fastness to rubbing.

Dyes of similar properties are obtained by using as coupling components the compounds listed in the following table instead of the reaction product from N-ethyl-N-(2-hydroxyethyl)-aminobenzene and 2,3-dichlorotetrahydrofurane:

| Example No. | Coupling component | Shade of dyeing on cellulose acetate |
|---|---|---|
| 14 | N-(2-cyanoethyl)-N-[2-(3-chlorotetrahydrofuran-2-yloxy)ethyl]aniline | Red. |
| 15 | N-ethyl-N-[3-cyano-2-(3-chlorotetrahydrofuran-2-yloxy)propyl]aniline | Red. |
| 16 | 3-methyl-N-ethyl-N-[2-(3-chlorotetrahydrofuran-2-yloxy)ethyl]aniline | Ruby. |

Example 17

24 parts of 1-amino-4-nitrobenzene-2-methylsulfone are introduced while stirring at 0° C. into a mixture of 35 parts of nitrosylsulfuric acid with a content of 12.1% of dinitrogen trioxide and 25 parts of concentrated sulfuric acid. After 12 hours, the diazo solution is poured onto 200 parts of ice, filtered and the filtrate introduced into a solution of 29.6 parts of a reaction product derived from N-ethyl-N-(2-hydroxyethyl)-amino benzene and 2,3-dichlorotetrahydrofurane in 25 parts of water. After stirring for four hours, the crystalline dye is filtered off, washed with water and dried at 40° C. under reduced pressure. It dyes cellulose acetate ruby red shades of very good washing, gas and light fastness.

Instead of the above-mentioned coupling component, the amines of the following table yield dyes with similar properties:

| Example No. | Coupling component | Shade of dyeing on cellulose acetate |
|---|---|---|
| 18 | (phenyl with CH₃ substituent)–N(C₂H₅)(C₂H₄O–tetrahydrofuryl with Cl) | Ruby. |
| 19 | phenyl–N(C₂H₄CN)(C₂H₄O–tetrahydrofuryl with Cl) | Red. |
| 20 | phenyl–N(C₂H₅)(CH₂–CH(O–tetrahydrofuryl with Cl)–CH₂CN) | Ruby. |

Example 21

18 parts of 2-amino-5-phenyl-1,3,4-thiadiazole are introduced while stirring at 0° to 5° C. into a mixture of 35 parts of nitrosylsulfuric acid with a content of 13.1% of dinitrogen trioxide, 25 parts of concentrated sulfuric acid and 100 parts of a mixture of anhydrous acetic acid and propionic acid at the ratio of 17:3. Another 100 parts of the acetic acid/propionic acid mixture are added at 0° to 5° C. to the mixture obtained and after three hours 4 parts of urea are added. The solution is slowly introduced at 0° to 5° C. into a mixture of 30.9 parts of the reaction product derived from N-(2-cyanoethyl)-N-(2-hydroxyethyl)-aminobenzene and 2,3-dichlorotetrahydrofurane, 50 parts of water and 10 parts of hydrochloric acid of the density 1.10, the mixture is stirred for an hour and then poured onto 100 parts of ice. The dye obtained is filtered off, washed with water and dried at 50° C. under reduced pressure. It dyes synthetic linear polyamides and polyesters bright red shades of excellent wet fastness.

A similar dye with excellent waste gas fastness is obtained by using 2-amino-5-ethylthiadiazole instead of 2-amino-5-phenylthiadiazole.

Similar dyes can be prepared from the components of the following table:

| Example No. | Diazo component | Coupling component | Shade of dyeing on cellulose acetate |
|---|---|---|---|
| 22 | 2-amino-5-phenyl-1,3,4-thiadiazole | phenyl–N(C₂H₅)(C₂H₄–O–tetrahydrofuryl with Cl) | Scarlet. |
| 23 | 2-amino-5-phenyl-1,3,4-thiadiazole | phenyl–N(C₂H₅)(CH₂–CH(O–tetrahydrofuryl with Cl)–CH₂CN) | Do. |
| 24 | 2-amino-5-phenyl-1,3,4-thiadiazole | (phenyl with CH₃ substituent)–N(C₄H₉)(C₂H₄O–tetrahydrofuryl with Cl) | Do. |

| Example No. | Diazo component | Coupling component | Shade of dyeing on cellulose acetate |
|---|---|---|---|
| 25 | 5-ethyl-2-amino-1,3-thiazole | N-ethyl-N-[2-(3-chlorotetrahydrofuran-2-yloxy)ethyl]aniline | Red. |
| 26 | 5-ethyl-2-amino-1,3-thiazole | N-(2-cyanoethyl)-N-[2-(3-chlorotetrahydrofuran-2-yloxy)ethyl]aniline | Orange. |
| 27 | 5-ethyl-2-amino-1,3-thiazole | N-ethyl-N-[2-cyano-1-(3-chlorotetrahydrofuran-2-yloxy)methyl-ethyl]aniline | Red. |
| 28 | 5-ethyl-2-amino-1,3-thiazole | N-butyl-N-[2-(3-chlorotetrahydrofuran-2-yloxy)ethyl]-3-methylaniline | Do. |
| 29 | 5-ethyl-2-amino-1,3-thiazole | N-(2-cyanoethyl)-N-[2-(3-chlorotetrahydrofuran-2-yloxy)ethyl]-3-methoxyaniline | Orange. |
| 30 | 5-ethyl-2-amino-1,3-thiazole | N-(2-cyanoethyl)-N-[2-(3-chlorotetrahydrofuran-2-yloxy)ethyl]-3-chloroaniline | Do. |
| 31 | 5-ethyl-2-amino-1,3-thiazole | N-(2-cyanoethyl)-N-[2-(3-chlorotetrahydrofuran-2-yloxy)ethyl]-3-trifluoromethylaniline | Do. |
| 32 | 5-ethyl-2-amino-1,3-thiazole | N-ethyl-N-[2-chloro-1-(3-chlorotetrahydrofuran-2-yloxy)methyl-ethyl]aniline | Red. |

*Example 33*

100 parts of a mixture of anhydrous acetic acid and propionic acid at the ratio 17:3 are introduced at 0° to 5° C. into a mixture of 31.7 parts of nitrosylsulfuric acid with a dinitrogen trioxide content of 13.1% and 15 parts of concentrated sulfuric acid, and then 14.5 parts of 2-amino-5-nitro-1,3-thiazole are added to the mixture at 0° to 5° C. Another 100 parts of the said acetic acid/propionic acid mixture are added and, after three hours, 8 parts of urea while stirring further at 0° to 5° C. The resultant clear solution is slowly introduced at 0° to 5° C. into a solution prepared as follows: 13.2 parts of 1-(bis - (2-hydroxyethyl)-amino)-2-methoxy-5-acetylaminobenzene are dissolved in 10 parts of dioxane and the reaction mixture, after adding 7.7 parts of 2,3-dichlorotetrahydrofurane, is heated for 15 minutes at 95° to 98° C. 33 parts of water are added at 35° C. to the resultant mixture and, after cooling to 0° C., 200 parts of ice.

After stirring for an hour, the reaction mixture is introduced into 3000 parts of ice water, the deposited dye is filtered off and dried at 30° C. under reduced pressure. It dyes cellulose acetate greenish blue shades of excellent waste gas fastness and excellent wet fastness.

Dyes with similar properties are obtained when the following coupling components are used instead of 1-(bis-(2-hydroxyethyl)-amino)-2-methoxy-5-acetylaminobenzene:

| Example No. | Coupling component | Shade of dyeing on cellulose acetate |
|---|---|---|
| 34 | OC₂H₅ / C₂H₄OH / N-C₂H₄O-[tetrahydrofuran-Cl] / HNCOCH₃ | Greenish blue. |
| 35 | OCH₃ / C₂H₄OH / N-C₂H₄O-[tetrahydrofuran-Cl] / HNCOCH₃ | Do. |
| 36 | OC₂H₅ / C₂H₄O-[Cl-tetrahydrofuran] / N / C₂H₄O-[tetrahydrofuran-Cl] / HN—COCH₃ | Do. |
| 37 | OCH₃ / C₂H₄O-[Cl-tetrahydrofuran] / N / C₂H₄O-[tetrahydrofuran-Cl] / HN—COCH₃ | Do. |
| 38 | OCH₃ / C₂H₄CN / N / C₂H₄O-[tetrahydrofuran-Cl] / HN—COCH₃ | Do. |
| 39 | OC₂H₅ / C₂H₄CN / N / C₂H₄O-[tetrahydrofuran-Cl] / HN—COCH₃ | Do. |

Example 40

A mixture of 7.85 parts of 4-nitro-4'-[N-ethyl-N-(2-hydroxyethyl)-amino]-azobenzene, 35 parts of dioxane, 5 parts of N-methylpyrrolidone and 7 parts of 2,3-dichlorotetrahydrofurane is heated for an hour at 100° C. The reaction mixture is then introduced into 100 parts of water and the deposited precipitate filtered off and dried at 50° C. under reduced pressure. A dye is obtained which is identical with that obtainable according to Example 2.

The dye described in Example 9 can also be obtained by using 8.7 parts of 4-nitro-2-chlor-4'-[N-ethyl-N-(2-hydroxyethyl)-amino]-azobenzene instead of the above 4-nitro-4'-[N-ethyl-N-(2-hydroxyethyl)-amino]-azobenzene.

Example 41

13.3 parts of 1-amino-2,4-dinitrobenzene-6-methylsulfone are introduced at 0° to 5° C. while stirring into a mixture of 16 parts of nitrosylsulfuric acid with a content of 13.1% of dinitrogen trioxide and 22 parts of concentrated sulfuric acid. After stirring for three hours, the diazo solution is added at 0° to 5° C. to a solution which has been prepared as follows:

13.4 parts of 1-[bis-(2-hydroxyethyl)-amino]-2-methoxy-5-acetylaminobenzene are dissolved in 10 parts of dioxane and the reaction mixture is heated for 15 minutes at 95° to 98° C. after adding 7.2 parts of 2,3-dichlorotetrahydrofurane.

The mixture obtained has 16 parts of water added to it at 35° C. and, after cooling to 0° C., 100 parts of ice and 1 part of aminosulfonic acid are added. After an hour, a solution of 20.5 parts of anhydrous sodium acetate in 100 parts of water is added to the mixture and the precipitated dye is filtered off and dried under reduced pressure at 50° C. after it has been washed with a saturated aqueous solution of sodium acetate and water.

The dye dyes cellulose acetate blue shades of good waste gas and light fastness.

Example 42

12.4 parts of 2,4-dinitro-6-brom-1-aminobenzene are introduced at 0° to 5° C. into a mixture of 16 parts of nitrosylsulfuric acid with a content of 13.1% of dinitrogen trioxide and 14 parts of concentrated sulfuric acid and stirred for 12 hours. Then the solution is poured onto 150 parts of ice and water, 1 part of aminosulfonic acid is added and the solution filtered into a coupling solution prepared analogously to Example 41 and the dye isolated as there described. It dyes cellulose acetate reddish blue shades of good fastness to light.

Example 43

8.25 parts of N-ethyl-N-(2-hydroxyethyl)-aminobenzene, 10 parts of dioxane and 7.3 parts of 2,3-dichlorotetrahydrofurane are heated together for 15 minutes at 95° to 98° C. After cooling to room temperature, 5 parts of concentrated hydrochloric acid and 25 parts of water are added. Into this solution, a diazo solution is allowed to flow which has been prepared as described in Example 42 with the difference that 8.25 parts of 2-amino-5-nitrobenzonitrile are used instead of 2,4-dinitro-6-brom-1-aminobenzene.

The whole is worked up as in Example 41 and a dye is obtained which dyes polyethylene terephthalate ruby-red shades of excellent fastness to rubbing.

Example 44

100 parts of a fabric of polyethylene glycol terephthalate are dyed for 90 minutes at boiling temperature in a bath which contains 0.5 part of the finely divided dye described in Example 43 and 4 parts of finely divided 1-hydroxy-2-phenylbenzene in 3000 parts of water. After powerful rinsing, the fabric is treated in a bath which contains 3 parts of about 32% aqueous sodium hydroxide solution and 3 parts of sodium dithionite in 3000 parts of water for 15 minutes at 80° C.

A violet dyeing of excellent fastness is obtained.

Example 45

100 parts of a fabric of cellulose 2½-acetate are dyed in a bath of 15 parts of the dye from Example 33, 2 parts of Marseilles soap and 4000 parts of water for 90 minutes at 98° to 100° C.

A greenish blue dyeing is obtained with very good waste gas fastness.

Example 46

100 parts of a fabric of cellulose triacetate are dyed in a bath of 2 parts of the dye of Example 17, 4 parts of Marseilles soap and 4000 parts of water for 60 minutes at 98° to 100° C.

A ruby-red dyeing of very good waste gas fastness and good light fastness is obtained.

We claim:
1. An azo dye of the formula

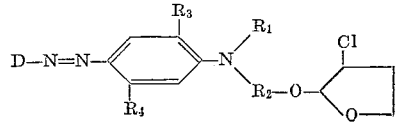

wherein D represents a diazo component selected from the class consisting of

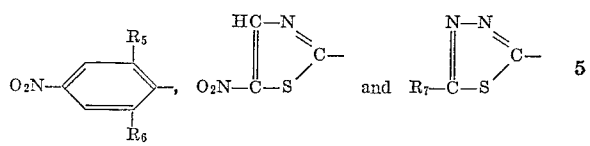

$R_1$ represents a radical selected from the class consisting of lower alkyl, β-hydroxyethyl, β-cyanoethyl and

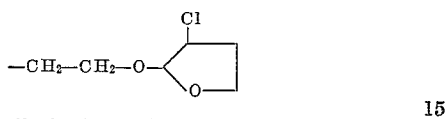

$R_2$ represents a radical selected from the class consisting of

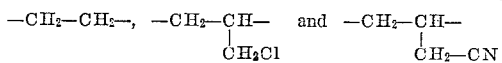

$R_3$ represents a radical selected from the class consisting of hydrogen, methoxy and ethoxy; $R_4$ represents a radical selected from the class consisting of hydrogen, chlorine, methoxy, methyl, trifluoromethyl and acetylamino; $R_5$ represents a radical selected from the class consisting of hydrogen, bromine, chlorine, methoxy, trifluoromethyl, cyano and methylsulfonyl; $R_6$ represents a radical selected from the class consisting of hydrogen and nitro; and $R_7$ represents a radical selected from the class consisting of ethyl and phenyl.

2. The dye of the formula

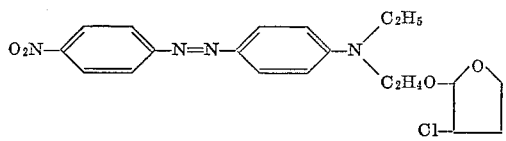

3. The dye of the formula

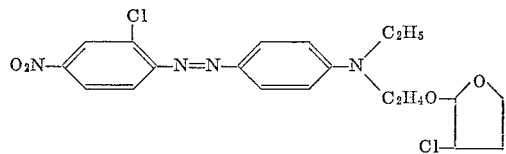

4. The dye of the formula

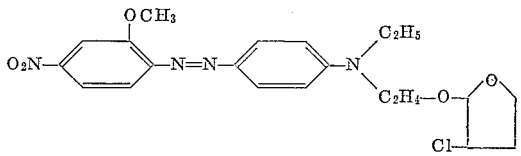

5. The dye of the formula

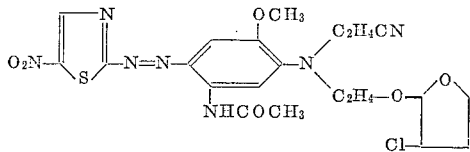

References Cited in the file of this patent

UNITED STATES PATENTS 2,199,987    Dickey et al. _____ May 7, 1940

OTHER REFERENCES

Gustus Liebigs Annalen der Chemie, volume 596 (1955), pages 113 to 115.

UNITED STATES PATENT OFFICE
CERTIFICATE OF CORRECTION

Patent No. 3,117,956                 January 14, 1964

Guenter Lange et al.

It is hereby certified that error appears in the above numbered patent requiring correction and that the said Letters Patent should read as corrected below.

Column 1, lines 13 to 17, for the first formula reading:

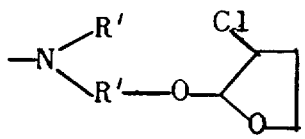     read     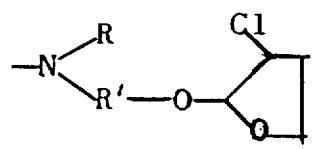

Same column, line 67, for "trifuoromethyl" read -- trifluoromethyl --; column 8, Example 24, under the heading "Coupling Components", for that portion of the formula reading:

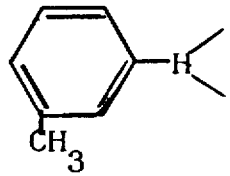     read     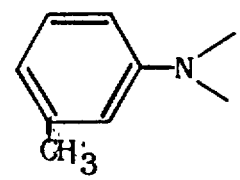

Column 9, Example 29, under the heading "Coupling components", for that portion of the formula reading:

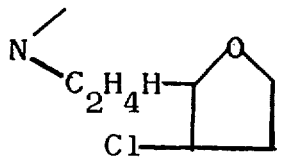     read     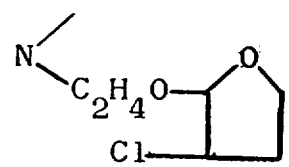

Signed and sealed this 14th day of July 1964.

(SEAL)
Attest:

ESTON G. JOHNSON                 EDWARD J. BRENNER
Attesting Officer                 Commissioner of Patents